United States Patent
Bist et al.

(10) Patent No.: US 12,199,770 B1
(45) Date of Patent: Jan. 14, 2025

(54) HIGH ACCURACY TIMESTAMPING OF TRANSMISSIONS AT PHYSICAL LAYER OF COMMUNICATION DEVICES AND SYSTEMS

(71) Applicant: Cadence Design Systems, Inc., San Jose, CA (US)

(72) Inventors: Hemlata Bist, Noida (IN); Shubham Agarwal, Gorakhpur (IN); Harshdeep Verma, Sirsa (IN); Rohit Mishra, Noida (IN)

(73) Assignee: Cadence Design Systems, Inc., San Jose, CA (US)

( * ) Notice: Subject to any disclaimer, the term of this patent is extended or adjusted under 35 U.S.C. 154(b) by 111 days.

(21) Appl. No.: 17/877,572

(22) Filed: Jul. 29, 2022

(51) Int. Cl.
  *H04L 1/1607* (2023.01)
  *H04L 1/00* (2006.01)
  *H04L 1/1867* (2023.01)

(52) U.S. Cl.
  CPC .......... *H04L 1/1678* (2013.01); *H04L 1/0083* (2013.01); *H04L 1/1893* (2013.01)

(58) Field of Classification Search
  CPC .... H04L 1/1678; H04L 1/0083; H04L 1/1893
  USPC .................................................. 714/748–750
  See application file for complete search history.

(56) References Cited

U.S. PATENT DOCUMENTS

| | | | |
|---|---|---|---|
| 9,282,024 B2 * | 3/2016 | Branscomb | H04L 63/162 |
| 2010/0080248 A1 * | 4/2010 | Aweya | H04J 3/0697 370/503 |
| 2012/0008646 A1 * | 1/2012 | Fourcand | H04J 3/0673 370/514 |
| 2014/0092918 A1 * | 4/2014 | Jost | H04J 3/0661 370/465 |
| 2015/0055644 A1 * | 2/2015 | Bordogna | H04J 3/0697 370/350 |
| 2019/0044839 A1 * | 2/2019 | Landau | H04L 1/0041 |
| 2019/0273571 A1 * | 9/2019 | Bordogna | H04J 3/0661 |
| 2020/0162179 A1 * | 5/2020 | Yang | H04J 3/0697 |
| 2020/0244383 A1 * | 7/2020 | He | H04W 56/00 |
| 2021/0203428 A1 * | 7/2021 | Bordogna | H04J 3/0697 |
| 2022/0150149 A1 * | 5/2022 | Landau | H04L 43/106 |

* cited by examiner

*Primary Examiner* — Albert Decady
*Assistant Examiner* — Osman M Alshack
(74) *Attorney, Agent, or Firm* — Foley & Lardner LLP (57) ABSTRACT

A method can include obtaining, at a physical communication layer integrated with a communication interface, a data packet, detecting, by a detection circuit integrated with the physical communication layer, a portion of data in the data packet corresponding to a marker identifying the data packet, linking, by the physical communication layer based on the marker, a timestamp with the data packet, and transmitting, by the physical communication layer, the data packet linked with the timestamp.

19 Claims, 9 Drawing Sheets

| Input Data | sync | Block Payload | | | | | | | | |
|---|---|---|---|---|---|---|---|---|---|---|
| Bit Position: | 0 1 2 | | | | | | | | | |
| Data Block Format: | | | $D_0$ | $D_1$ | $D_2$ | $D_3$ | $D_4$ | $D_5$ | $D_6$ | $D_7$ |
| $D_0D_1D_2D_3/D_4D_5D_6D_7$ | | | $D_0$ | $D_1$ | $D_2$ | $D_3$ | $D_4$ | $D_5$ | $D_6$ | $D_7$ |
| Control Block Formats: | | Block Type Field | | | | | | | | |
| $C_0C_1C_2C_3/C_4C_5C_6C_7$ | 10 | 0x1e | $C_0$ | $C_1$ | $C_2$ | $C_3$ | $C_4$ | $C_5$ | $C_6$ | $C_7$ |
| $C_0C_1C_2C_3/O_4D_5D_6D_7$ | 10 | 0x2d | $C_0$ | $C_1$ | $C_2$ | $C_3$ | $O_4$ | $D_5$ | $D_6$ | $D_7$ |
| $C_0C_1C_2C_3/S_4D_5D_6D_7$ | 10 | 0x33 | $C_0$ | $C_1$ | $C_2$ | $C_3$ | $S_4$ | $D_5$ | $D_6$ | $D_7$ |
| $O_0D_1D_2D_3/S_4D_5D_6D_7$ | 10 | 0x66 | $D_1$ | $D_2$ | $D_3$ | $O_0$ | $S_4$ | $D_5$ | $D_6$ | $D_7$ |
| $O_0D_1D_2D_3/O_4D_5D_6D_7$ | 10 | 0x55 | $D_1$ | $D_2$ | $D_3$ | $O_0$ | $O_4$ | $D_5$ | $D_6$ | $D_7$ |
| $S_0D_1D_2D_3/D_4D_5D_6D_7$ | 10 | 0x78 | $D_1$ | $D_2$ | $D_3$ | $S_0$ | $D_4$ | $D_5$ | $D_6$ | $D_7$ |
| $O_0D_1D_2D_3/C_4C_5C_6C_7$ | 10 | 0x4b | $D_1$ | $D_2$ | $D_3$ | $O_0$ | $C_4$ | $C_5$ | $C_6$ | $C_7$ |
| $T_0C_1C_2C_3/C_4C_5C_6C_7$ | 10 | 0x87 | $C_1$ | $C_2$ | $C_3$ | | $C_4$ | $C_5$ | $C_6$ | $C_7$ |
| $D_0T_1C_2C_3/C_4C_5C_6C_7$ | 10 | 0x99 | $D_0$ | $C_2$ | $C_3$ | | $C_4$ | $C_5$ | $C_6$ | $C_7$ |
| $D_0D_1T_2C_3/C_4C_5C_6C_7$ | 10 | 0xaa | $D_0$ | $D_1$ | $C_3$ | | $C_4$ | $C_5$ | $C_6$ | $C_7$ |
| $D_0D_1D_2T_3/C_4C_5C_6C_7$ | 10 | 0xb4 | $D_0$ | $D_1$ | $D_2$ | | $C_4$ | $C_5$ | $C_6$ | $C_7$ |
| $D_0D_1D_2D_3/T_4C_5C_6C_7$ | 10 | 0xcc | $D_0$ | $D_1$ | $D_2$ | $D_3$ | | $C_5$ | $C_6$ | $C_7$ |
| $D_0D_1D_2D_3/D_4T_5C_6C_7$ | 10 | 0xd2 | $D_0$ | $D_1$ | $D_2$ | $D_3$ | $D_4$ | | $C_6$ | $C_7$ |
| $D_0D_1D_2D_3/D_4D_5T_6C_7$ | 10 | 0xe1 | $D_0$ | $D_1$ | $D_2$ | $D_3$ | $D_4$ | $D_5$ | | $C_7$ |
| $D_0D_1D_2D_3/D_4D_5D_6T_7$ | 10 | 0xff | $D_0$ | $D_1$ | $D_2$ | $D_3$ | $D_4$ | $D_5$ | $D_6$ | |

HIGH ACCURACY TIMESTAMPING OF TRANSMISSIONS AT PHYSICAL LAYER OF COMMUNICATION DEVICES AND SYSTEMS

TECHNICAL FIELD

The present implementations relate generally to computer networks, and more particularly to high accuracy timestamping of transmissions at a physical layer of communication devices and systems.

INTRODUCTION

Electronic communication is increasingly exposed to deployments and situations with strict demands on responsiveness. In the event that electronic communication is not able to meet strict demands on responsiveness, the scope of use of electronic communication is reduced, and the reliability of electronic communication is not sufficient to effectively and efficiently address deployment in a significant number of desired deployments and situations.

SUMMARY

Aspects of this technical solution are directed to high accuracy timestamping of transmissions at a physical layer of communication devices and systems. Present implementations can provide timestamping of network traffic through a network communication device or network communication interface that eliminates timestamping error due to propagation through the network communication device or network communication interface. A network communication device or network communication interface can apply a timestamp to an entire packet of a device at a hardware layer. Applying a timestamp to a packet can provide at least the technical improvement of reducing computational processing of timestamping individual bits or portions of a packet during processing at a logical layer of a network communication device or network communication interface. Applying a timestamp at a hardware layer can provide at least the technical improvement of eliminating timestamp error by eliminating a timestamp offset based on an estimation of propagation delay through a network architecture from a hardware layer where a packet is received, to a logical layer where timestamping occurs. Thus, a technological solution for high accuracy timestamping of transmissions at a physical layer of communication devices and systems is provided.

At least one aspect is directed to a method of obtaining, at a physical communication layer integrated with a communication interface, a data packet. The method can include detecting, by a detection circuit integrated with the physical communication layer, a portion of data in the data packet corresponding to a marker identifying the data packet. The method can include linking, by the physical communication layer, a timestamp with the data packet. The method can include transmitting, by the physical communication layer, the data packet linked with the timestamp.

The method can include linking, by the physical communication layer in response to detecting an interrupt and based on the marker, the timestamp with the data packet. The method can include triggering, by the physical communication layer in response to the detecting the marker, the interrupt. The method can include transmitting, by the physical communication layer, the data packet linked with the timestamp to a logical communication layer integrated with the communication interface. The method further can include transmitting, by the physical communication layer, the data packet linked with the timestamp to a second physical communication layer integrated with a second communication interface operatively coupled with and external to the communication interface.

The method can include obtaining the data packet from a logical communication layer integrated with the communication interface in accordance with a transmit operation of the communication interface. The method can include obtaining the data packet from a second physical communication layer integrated with a second communication interface in accordance with a receive operation of the communication interface. The method can include detecting the marker based on a pattern corresponding to the marker and having a digital format.

The communication interface can include an Ethernet stack, and the physical communication layer can include a physical medium attachment (PMA) layer of the Ethernet stack. The marker can include a start frame delimiter (SFD), and the detection circuit configured to detect the SFD. The method can include splitting, by a logical communication layer integrated with the communication interface in response to a determination that the SFD corresponds to a particular type, the SFD into a first block and a second block. The method can include detecting, by the detection circuit, the first block to identify the marker.

A device can include a physical communication layer integrated with a communication interface, the physical communication layer configured to obtain a data packet, link a timestamp with the data packet based on a marker identifying the data packet, and transmit the data packet linked with the timestamp. The device can include a detection circuit integrated with the physical communication layer, the detection circuit configured to detect a portion of data in the data packet corresponding to the marker identifying the data packet.

The physical communication layer can be configured to trigger an interrupt in response to the detecting the marker, and to link the timestamp with the data packet in response to detecting the interrupt. The physical communication layer can be configured to transmit the data packet linked with the timestamp to one or more of a logical communication layer integrated with the communication interface, and a second communication interface operatively coupled with and external to the communication interface. The physical communication layer can be configured to obtain the data packet from one or more of a logical communication layer integrated with the communication interface in accordance with a transmit operation of the communication interface, and a second physical communication layer integrated with a second communication interface in accordance with a receive operation of the communication interface. The communication interface can include an Ethernet stack, and the physical communication layer can include a physical medium attachment (PMA) layer of the Ethernet stack. The marker can include a start frame delimiter (SFD), and the detection circuit configured to detect the SFD. The device can include a physical coding sublayer (PCS) integrated with the communication interface, the PCS configured to split the SFD into a first block and a second block in response to a determination that the SFD corresponds to a particular type. The device can include the detection circuit configured to detect the first block to identify the marker.

A system can include a physical communication layer integrated with a communication interface, the physical communication layer configured to obtain a data packet, link a timestamp with the data packet based on a marker identifying the data packet, and transmit the data packet linked with the timestamp. The system can include a detection circuit integrated with the physical communication layer, the detection circuit configured to detect a portion of data in the data packet corresponding to the marker identifying the data packet. The communication interface can include an Ethernet stack, and the physical communication layer can include a physical medium attachment (PMA) layer of the Ethernet stack.

BRIEF DESCRIPTION OF THE DRAWINGS

These and other aspects and features of the present implementations will become apparent to those ordinarily skilled in the art upon review of the following description of specific implementations in conjunction with the accompanying figures, wherein.

DETAILED DESCRIPTION

The present implementations will now be described in detail with reference to the drawings, which are provided as illustrative examples of the implementations so as to enable those skilled in the art to practice the implementations and alternatives apparent to those skilled in the art. Notably, the figures and examples below are not meant to limit the scope of the present implementations to a single implementation, but other implementations are possible by way of interchange of some or all of the described or illustrated elements. Moreover, where certain elements of the present implementations can be partially or fully implemented using known components, only those portions of such known components that are necessary for an understanding of the present implementations will be described, and detailed descriptions of other portions of such known components will be omitted so as not to obscure the present implementations. Implementations described as being implemented in software should not be limited thereto, but can include implementations implemented in hardware, or combinations of software and hardware, and vice-versa, as will be apparent to those skilled in the art, unless otherwise specified herein. In the present specification, an implementation showing a singular component should not be considered limiting. Rather, the present disclosure is intended to encompass other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present implementations encompass present and future known equivalents to the known components referred to herein by way of illustration.

Time synchronization can be a crucial parameter for time-aware networks like telecommunication, industrial automation, and connected cars. Time-aware networks can include 5G telecom networks, and other network architectures demanding latency below the nanosecond level. For example, with 5G being a low timestamping error-tolerant network, the timestamping error performance parameter values are quite stringent for it. Thus, the need for high accuracy timestamping has become even more important, and to meet timestamping accuracy and error performance numbers for 5G and other networks having stringent latency and error-tolerance requirements. A technical solution can include a serial high-speed Ethernet stack, with a special frame marker Start of Frame Delimiter (SFD) for timestamping. Timestamping at the SFD can achieve timing synchronization between Ethernet time-aware nodes.

Timestamps can be used for assessing network latency and synchronization-related measurements in modern communication networks. Accuracy can include a quality of being near to a true value. Timestamping error can include deviation in timestamped values of an event from its actual occurrence. Maximizing accuracy of timestamping in a network interface can be dependent on various factors. First, timestamping and identification of an SFD should be done as nearest to the physical medium as possible, to maximize timestamping accuracy. Second, an SFD field can be restricted to processing at a Medium Access Control (MAC) level on both transmit and receive portions of an Ethernet stack.

In various approaches for operations at a transmit side, an SFD can be timestamped at a MAC layer or logical layer. Then, the value of the SFD can be propagated through all the frame processing blocks of PHY or a physical layer until the value of the SFD reaches the serial data line on the medium. Such operation can introduce timestamping error due to timestamps at a layer different from a layer to which the time stamp corresponds. In various approaches for operations at a receive side, the SFD timestamping value is not directly available at PHY, because the physical line is serial and identification of sampled bits as SFD is prevented due to an encoded and scrambled state of the received data. To accommodate this restriction, a timestamping value can be estimated by subtracting latency of the receive side of the PHY stack from the time at which the SFD is first identified at the MAC layer. The estimation process introduces error into the timestamp, reducing the reliability of the timestamping process for application areas requiring high accuracy. Further, timestamping inaccuracies can be introduced in the receive path, due to the timestamping of each serial bit from the medium and then propagate its value through all frame processing layers of the PHY or physical layer of the receive side.

Present implementations provide a technical improvement that minimizes timestamping errors on the transmit and receive sides of network communication devices and interfaces, including an Ethernet stack. For example, the encoded value of SFD can be predetermined on the transmit side. The SFD value can be set to or associated with, for example, a 64/66 bit encoding of Spec IEEE 802.3-2018. Thus, a scrambler on a transmit side can advantageously be bypassed. The network communication interface or device can include a pattern detection logic to detect encoded SFD values, or any predetermined marker in network traffic, where the serial data is passes through the physical medium. For example, after the SFD is detected on a transmit side at the physical medium, the SFD can be timestamped and the network communication device or interface can issue an interrupt or callback. High accuracy can include, for example, the elimination of error corresponding to timestamps. This process provides the technical improvement of avoiding the scope of any timestamping error introduction, because propagation of timestamping value through the whole network communication stack is eliminated.

On the receive side, present implementations can include SFD pattern detection logic, to sample a serial data stream from the physical medium. For example, after the pattern detection logic detects the SFD detected, the SFD is timestamped and the network communication device or interface can issue an interrupt or callback. Present implementations can thus provide a technical improvement eliminating calculation of timestamp propagation estimation and any error introduced by that estimation, and eliminating timestamping each serial bit and propagating each bit to a MAC or logical layer to identify an SFD.

Figure 1:
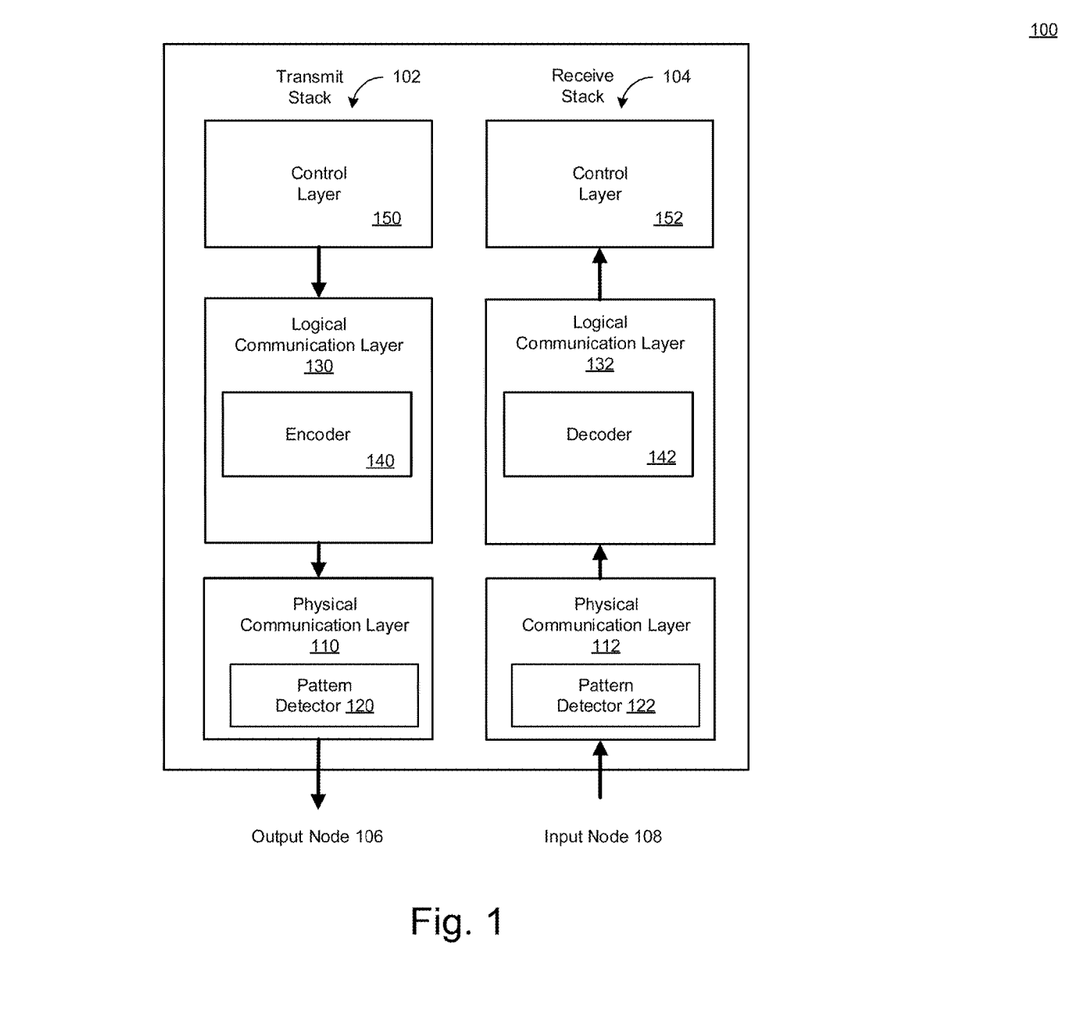
FIG. 1 illustrates a device, in accordance with present implementations.

FIG. 1 illustrates a device, in accordance with present implementations. According to aspects of the present disclosure, the device can apply a timestamp to a packet of a device at a hardware layer and/or detect such a timestamp applied to a packet. As set forth above, applying a timestamp at a hardware layer can provide at least the technical improvement of eliminating timestamp error by eliminating a timestamp offset based on an estimation of propagation delay through a network architecture from a hardware layer where a packet is received, to a logical layer where timestamping occurs As illustrated by way of example in FIG. 1, a device 100 can include a transmit stack 102, a receive stack 104, an output node 106, and an input node 108. The transmit stack 102 and receive stack 104 can each include a plurality of layers. Each of the layers can correspond to various communication processing components of a network communication device or network communication interface. For example, the transmit stack 102 can include communication processing components corresponding to communication to send a transmission by the output node 106, according at least partially to one or more Ethernet protocols. For example, the receive stack 104 can include communication processing components corresponding to communication to receive a transmission by the input node 108, according at least partially to one or more Ethernet protocols. One or more of the input node 106 and the output node 108 can be operatively coupled with one or more external network communication devices, electronic or electrical devices, or any combination thereof.

The device 100 can include a physical or logical device, and can be integrated into a physical communication device or a verification device. A physical communication device can include one or more hardware elements to perform an electronic communication. For example, a physical communication device can include one or more of a portion of a solid state electronic device, a portion of an integrated circuit, and a chipset including one or more integrated circuit devices, or any combination thereof. For example, the physical communication device can be integrated into a handset, mobile computer, smartphone, or the like. A verification device can include a physical or virtual device, and can perform one or more testing operations during or in connection with operation of the device 100. For example, the verification device can be configured to monitor one or more aspects of operation of the physical communication device.

The transmit stack 102 can include a physical communication layer 110, a logical communication layer 130, and a control layer 150. The transmit stack 102 can perform a communication from the control layer 150 to the physical communication layer 110. The receive stack 104 can include a physical communication layer 112, a logical communication layer 132, and a control layer 152. The receive stack 104 can perform a communication from the physical communication layer 112 to the control layer 152.

The physical communication layers 110 and 112 can include one or more electrical or electronic components to transmit or translate communication from the network communication device or interface to or from an external device or interface. For example, the control layer 150 can include one or more buffers, interrupt controllers, serializers, deserializers, or any combination thereof. For example, the physical communication layers 110 and 112 can include a Physical Medium Attachment (PMA) layer in accordance with an Ethernet communication protocol.

The physical communication layer 110 can include a pattern detector 120. The pattern detector 120 can detect one or more predetermined patterns corresponding to one or more aspects of an input received at the pattern detector. For example, the pattern detector 120 can include one or more logical or physical components to detect a match between a particular predetermined sequence of bits and an input sequence of bits. For example, a sequence of bits can be received in binary or hexadecimal format. The pattern detector can include, for example a comparator device to determine whether a particular portion of an input to the pattern detector 110 matches a particular target sequence. The physical communication layer 112 can include a pattern detector 122. The pattern detector 122 can correspond at least partially in one or more of structure and operation to the physical communication layer 110. For example, the pattern detector 122 can detect one or more patterns detectable by the pattern detector 120. The pattern detectors 120 and 122 can detect patterns compatible with an Ethernet protocol, and can identify a particular packet or particular portion of data based on the detected pattern.

The logical communication layer 130 can include one or more electrical or electronic components to transmit or translate communication across layers of the network communication device or interface. For example, the logical communication layer 130 can include a Physical Coding Sublayer (PCS) layer in accordance with an Ethernet communication protocol. A PHY physical layer can include a PCS layer and a PMA layer.

The logical communication layer 130 can include an encoder 140. The encoder 140 can transform at least a portion of a data packet into a format compatible with the physical communication layer 110. For example, the encoder 140 can generate an encoded block compatible with an Ethernet protocol. The logical communication layer 132 can include a decoder 142. The decoder 142 can correspond at least partially in one or more of structure and operation to the encoder 140. For example, the decoder 142 can perform a reverse, inverse, or converse of one or more encoding operations performable by the encoder 140. For example, a sequential operation of the encoder and the decoder on a particular data packet or data object can return the original input data packet or data object.

The control layer 150 can include one or more electrical or electronic components to execute logical decision flows. For example, the control layer 150 can include one or more message handlers, authentication processors, data integrity validation components, or any combination thereof. For example, the control layer 150 can include a MAC layer in accordance with an Ethernet communication protocol.

Figure 2:
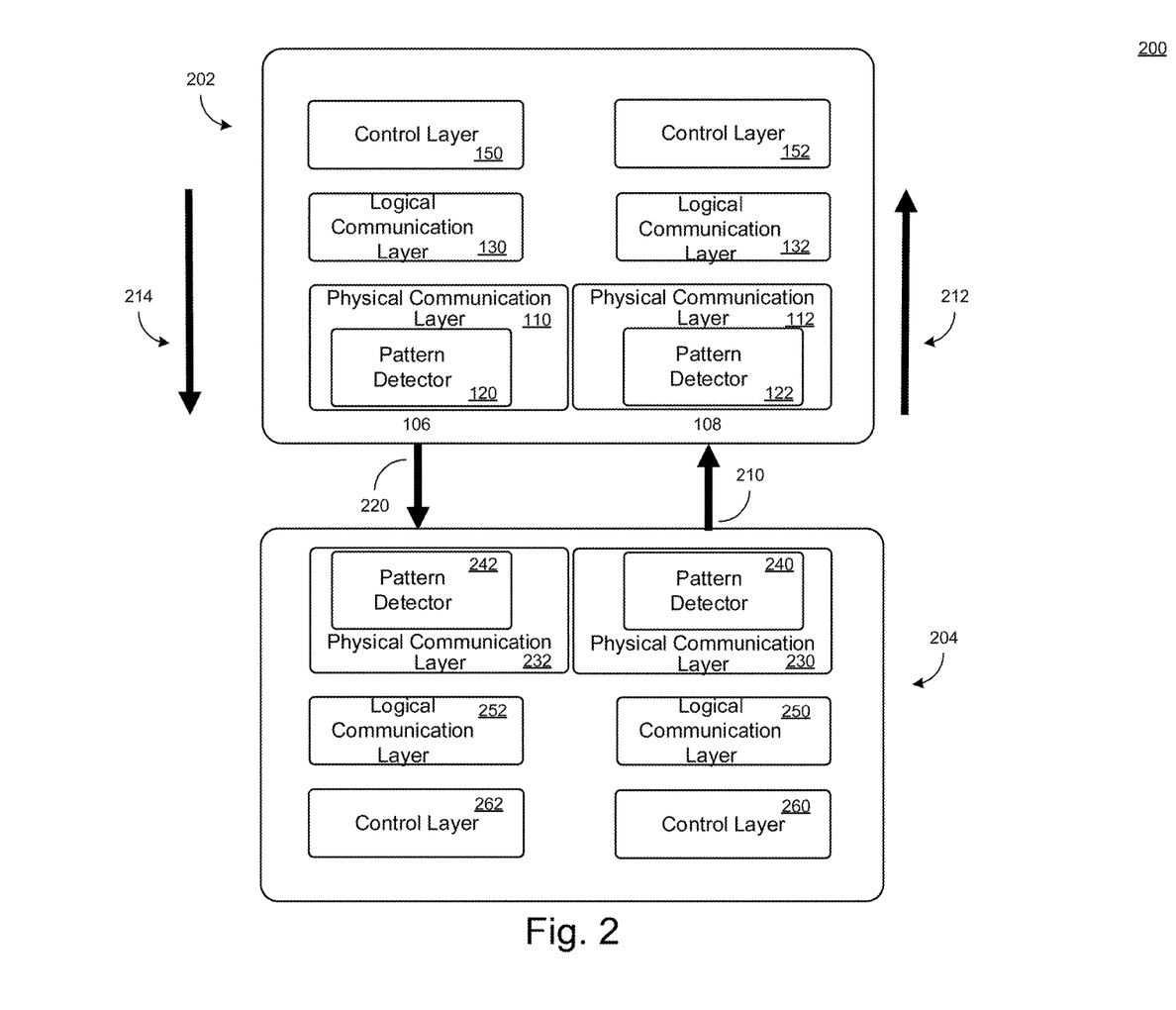
FIG. 2 illustrates a system, in accordance with present implementations.

FIG. 2 illustrates a system, in accordance with present implementations. As illustrated by way of example in FIG. 2, a system 200 can include a first network device 202, a second network device 204, an input packet path 210, a timestamped packet path 212, a timestamped packet path 214, and an output packet path 220. The first network device 202 and the second network device 204 can each correspond to the device 100. The first network device 202 can include the output node 106, the input node 108, the physical communication layer 110, the logical communication layer 130, the control layer 150, the physical communication layer 112, the logical communication layer 132, and the control layer 152. The second network device 204 can include a physical communication layer 230, the logical communication layer 250, the control layer 260, the physical communication layer 232, the logical communication layer 252, and the control layer 262, corresponding at least partially in one or more of structure and operation respectively to elements 110, 130, 150, 112, 132 and 152. An input 108 of the first network device 202 can be operatively coupled with an output of the second network device 204. An output 106 of the first network device 202 can be operatively coupled with an input of the second network device 204. Thus, the first network device 202 and the second network device 204 can be operatively coupled to allow bidirectional communication there between.

The input packet path 210 can indicate a transmission path of a packet by the physical communication layer 230 of the second network device 204 to the physical communication layer 112 of the first network device 202. The physical communication layer 112 can timestamp a packet at the physical communication layer 112 before transmission of the packet along the timestamped packet path. The timestamped packet path 212 can indicate a transmission path of a packet from the physical communication layer 112 of the first network device 202 to the control layer 152 of the first network device 202. Thus, the packet traveling by the timestamped packet path 212 can include a timestamp usable by the first network device 202 or any external device coupled therewith that eliminates any introduction of error due to latency of travel of the packet by the timestamped packet path 212.

The timestamped packet path 214 can indicate a transmission path of a packet from the control layer 150 of the first network device 202 to the physical communication layer 110 of the first network device 202. Thus, the packet traveling by the timestamped packet path 214 can include a timestamp usable by the first network device 202 or any external device coupled therewith that eliminates any introduction of error due to latency of travel of the packet by the timestamped packet path 212. The output packet 220 can indicate a transmission path of a packet by the physical communication layer 110 of the first network device 202 to the physical communication layer 232 of the second network device 204. The physical communication layer 232 can timestamp a packet at the physical communication layer 232 before transmission of the packet along a timestamped packet path of the second network device 204.

Figure 3A:
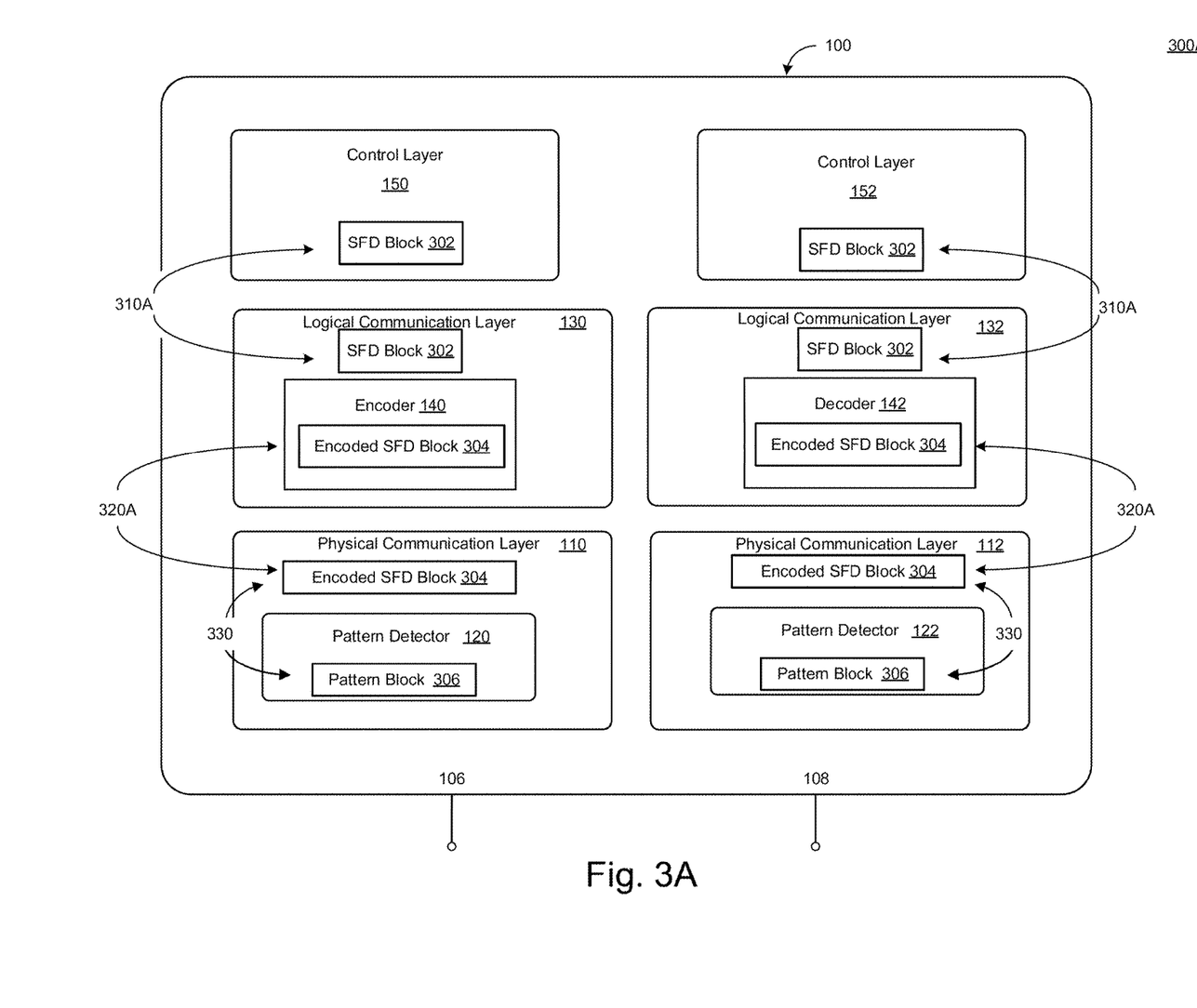
FIG. 3A illustrates a system, in accordance with present implementations.

FIG. 3A illustrates a system, in accordance with present implementations. As illustrated by way of example in FIG. 3A, a system 300A can include the device 100, a transmission 310A with the logical layer, a transmission 320A with the physical layer, and a transmission 330 with a pattern detector. The device 100 can include the output node 106, the input node 108, the physical communication layers 110 and 112, the logical communication layers 130 and 132, and the control layers 150 and 152.

The control layer 150 can obtain an SFD block 302 from a data packet. For example, one or more of the data packet and the SFD block 302 can have a structure corresponding to a particular lane of a communication compatible with an Ethernet protocol. For example, the lane can be or include Lane 0. For example, the communication can be compatible with a 10 gigabit media-independent interface (XGMII) protocol. The SFD block 302 can include one or more hexadecimal characters. The control layer 150 can transmit the SFD block 302 to the logical communication layer 130 by transmission 310A.

The logical communication layer 130 can transmit the SFD block 302 to the encoder 140. The encoder 140 can transform the SFD block 302 into an encoded block 304 corresponding to a particular data structure, format, or any combination thereof. For example, the encoder 140 can encode the SFD block 302 according to a 49-7 64 bit/66 bit block format. For example, the encoder 140 can transform the SFD block 302 into an encoded SFD block 304 having a block post encoding. The logical communication layer 130 can transmit the encoded SFD block 304 to the physical communication layer 110 by transmission 320B.

The physical communication layer 110 can transmit the encoded block 304 to the pattern detector 120 by transmission 330. The pattern detector 120 can identify a pattern within the encoded SFD block 304 corresponding to a particular data sequence. The pattern detector 120 can transform the encoded SFD block 304 into a pattern block 306. The pattern detector 120 can transform the encoded SFD block 304 by moving, shifting, reversing, or the like, bit positions of one or more bits of the encoded SFD block 304. For example, the pattern detector 120 can transfer bit positions from the most significant bit position to the least significant bit position to generate the pattern block 306. For example, the pattern detector 120 can transform hexadecimal 78 into hexadecimal 1E by reversing the binary bits from 0111_1000 to 0001_1110. For example, the pattern detector 120 can transform hexadecimal CC into hexadecimal 33 by reversing the binary bits from 1100_1100 to 0011_0011.

Figure 3B:
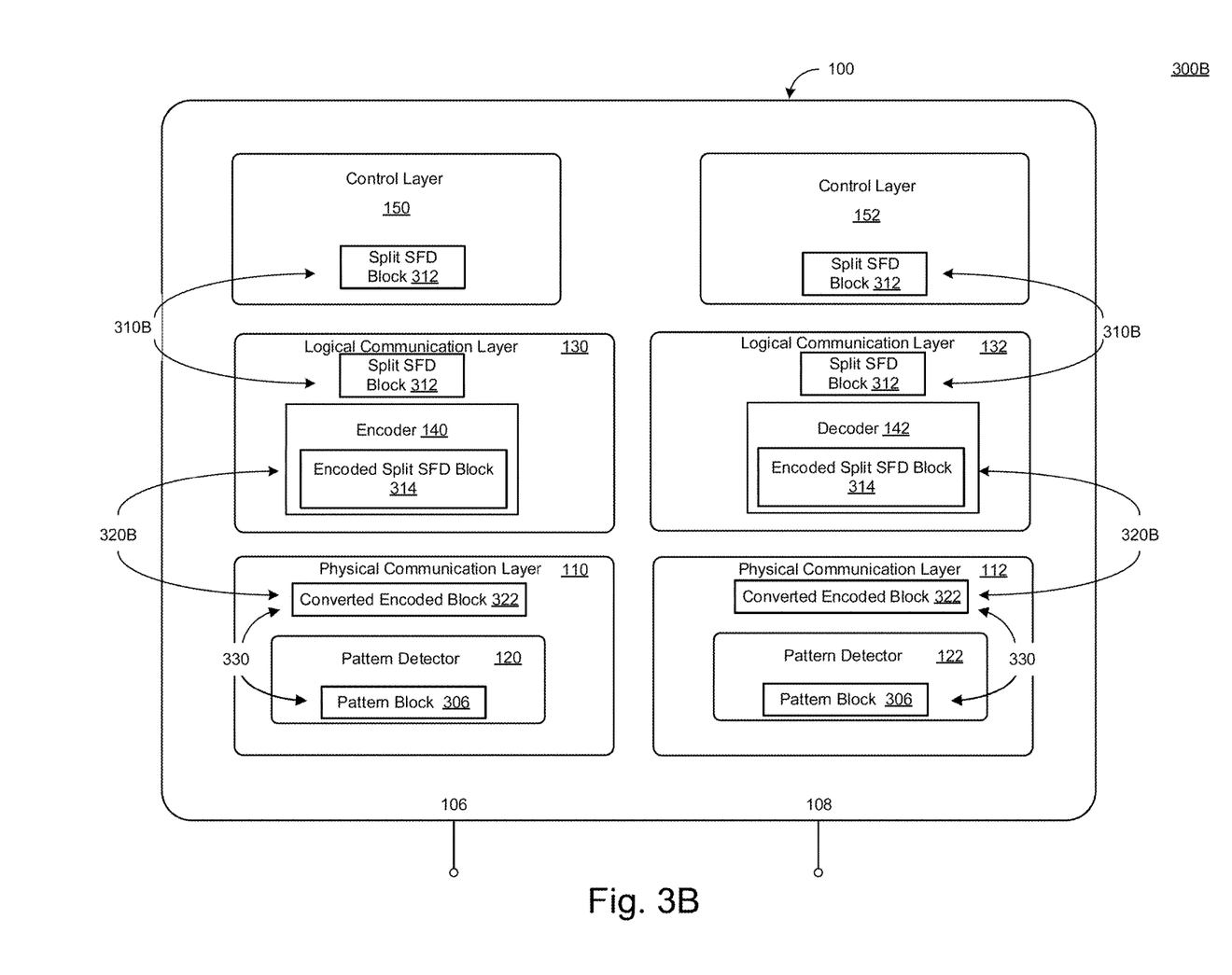
FIG. 3B illustrates a system, in accordance with present implementations.

FIG. 3B illustrates a system, in accordance with present implementations. As illustrated by way of example in FIG. 3B, a system 300B can include the device 100, a transmission 310B with the logical layer, a conversion transmission 320B with the physical layer, and the transmission 330 with a pattern detector. The device 100 can include the output node 106, the input node 108, the physical communication layers 110 and 112, the logical communication layers 130 and 132, and the control layers 150 and 152.

The control layer 150 can generate a split SFD block 312 from an SFD block 302 obtained from a data packet. For example, one or more of the data packet and the SFD block 302 can have a structure corresponding to a particular lane of a communication compatible with an Ethernet protocol. For example, the lane can be or include Lane 4. For example, the communication can be compatible with a 10 gigabit media-independent interface (XGMII) protocol. The split SFD block 312 can include one or more hexadecimal characters. The control layer 150 can split the SFD block 302 obtained having a Lane 4 structure at one or more points in the SFD block 302. For example, the control layer 150 can split the SFD block 302 after an eight byte from the most significant byte of the SFD block 302 and transmit one or more splits to generate or obtain one or more split SFD blocks 312. The control layer 150 can discard or ignore one or more byte addresses, including one or more bytes indicating a destination address for the SFD block 302 to generate or obtain the split SFD block 312. The control layer 150 can transmit the split SFD block 312 to the logical communication layer 130 by transmission 310B.

The logical communication layer 130 can transmit the split SFD block 312 to the encoder 140. The encoder 140 can transform the split SFD block 312 into an encoded split SFD block 314 corresponding to a particular data structure, format, or any combination thereof. For example, the encoder 140 can encode the split SFD block 312 according to a 49-7 64 bit/66 bit block format. For example, the encoder 140 can transform the split SFD block 312 into an encoded split SFD block 314 having a block post encoding. For example, the encoder 140 can add two bits corresponding to a sync header to the least significant bits of the encoded split SFD block 314. Further, the encoder 140 can encode a second portion of the SFD block 302 split from the SFD block 302 after the sync header bits, to generate or obtain a converted encoded block 322. The logical communication layer 130 can transmit the converted encoded block 322 to the physical communication layer 110 by transmission 330.

The physical communication layer 110 can transmit the converted encoded block 322 to the pattern detector 120 by transmission 330. The pattern detector 120 can identify a pattern within the converted encoded block 322 corresponding to a particular data sequence. The pattern detector 120 can transform the converted encoded block 322 into a pattern block 306. The pattern detector 120 can transform the converted encoded block 322 by moving, shifting, reversing, or the like, bit positions of one or more bits of the encoded SFD block 304. For example, the pattern detector 120 can transfer bit positions from the most significant bit position to the least significant bit position to generate the pattern block 306. For example, the pattern detector 120 can transform hexadecimal 78 into hexadecimal 1E by reversing the binary bits from 0111_1000 to 0001_1110. For example, the pattern detector 120 can transform hexadecimal CC into hexadecimal 33 by reversing the binary bits from 1100_1100 to 0011_0011. The transmissions 310A, 310B, 320A, 320B and 330 can be performed bidirectionally at either the transmit or receive stacks, through either of the layers 110, 130 and 150, or 112, 132 and 152.

Figure 4:
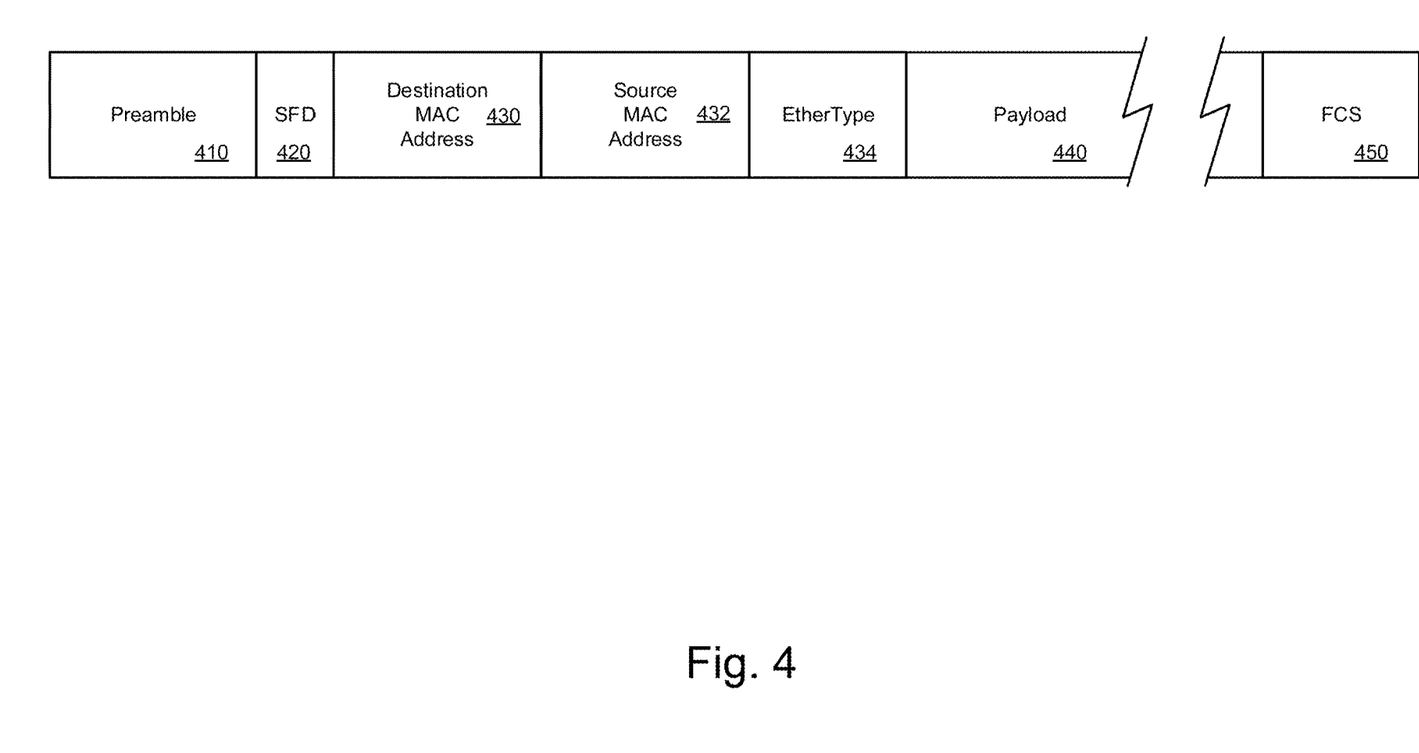
FIG. 4 illustrates a packet architecture, in accordance with present implementations.

FIG. 4 illustrates a packet architecture, in accordance with present implementations. As illustrated by way of example in FIG. 4, a data packet 400 can include a preamble 410, an SFD 420, a destination MAC address 430, a source MAC address 432, an ethertype 434, a payload 440, and an FCS 450. The structure of the data packet 400 can correspond to a data packet compatible with an Ethernet protocol, for example.

Figure 5:
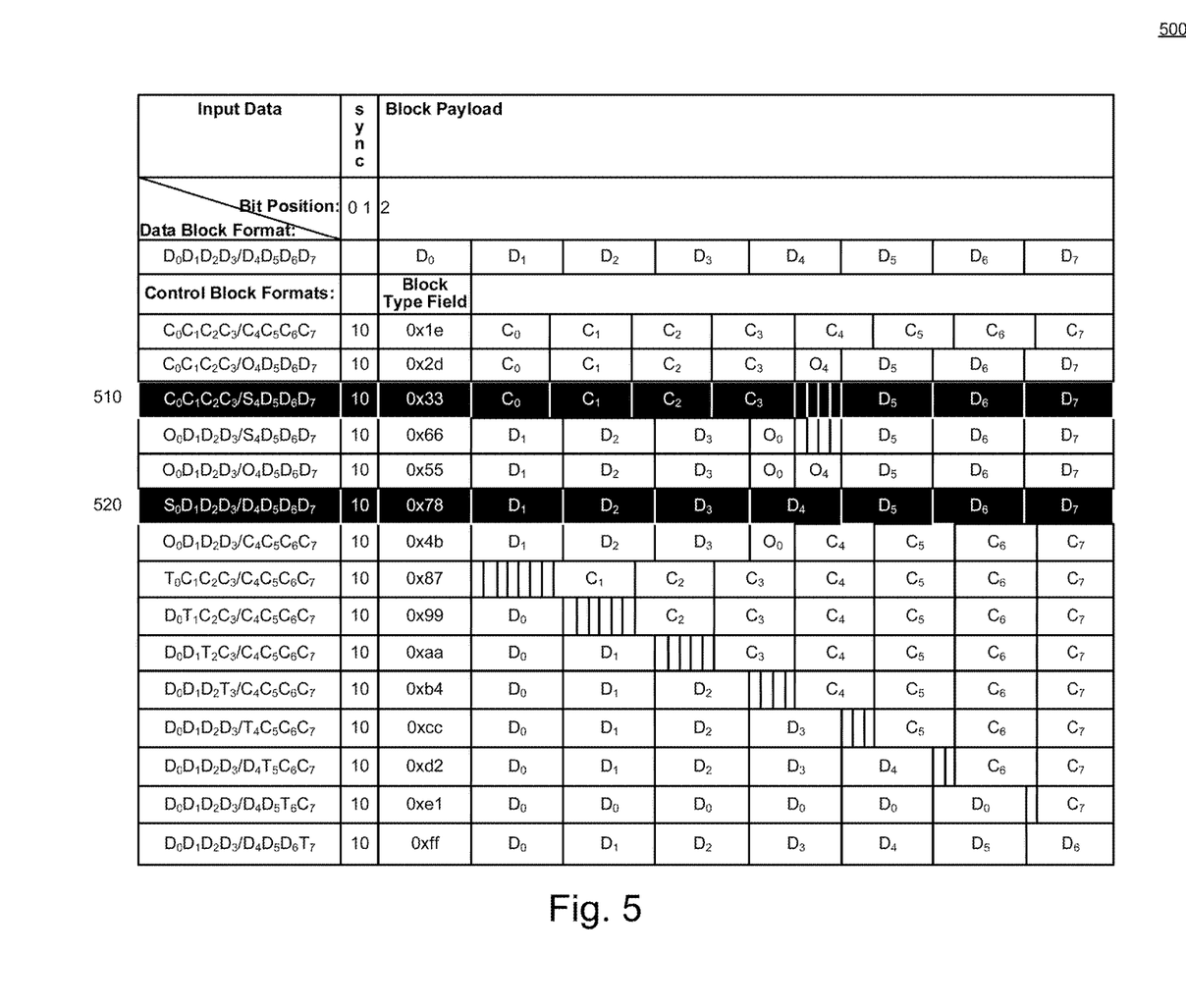
FIG. 5 illustrates a pattern architecture, in accordance with present implementations.

FIG. 5 illustrates a pattern architecture, in accordance with present implementations. As illustrated by way of example in FIG. 5, a pattern architecture 500 can include a first pattern architecture 510, and a split pattern architecture 520.

Present implementations can include a Start of Frame Delimiter (SFD) pattern detector 120 to perform accurate and error-free timestamping. A scrambler device of a network communication device or interface can be bypassed and detection can be performed on an encoded value of SFD determined based on an encoding architecture. An encoding architecture can correspond to an encoding table compatible with an Ethernet protocol. For example, an SFD block can be detected based on a pattern of a data packet detected matching or corresponding to a first pattern architecture 510. The first pattern architecture 510 can correspond to a Lane 0 pattern as discussed herein. For example, an SFD block can be detected based on a pattern of a data packet detected matching or corresponding to a second pattern architecture 520. The second pattern architecture 520 can correspond to a Lane 4 pattern as discussed herein.

This technical solution can thus provide multiple technical improvements, including at least the below. For example, this technical solution can minimize timestamping errors on transmit and receive sides of Ethernet stacks. For example, this technical solution can eliminate overhead caused by propagating a timestamp value through a network communication device or interface stack. For example, this technical solution can eliminate hardware or logic to timestamp each serial data on receive side, including eliminating calculation on the receive side to retrieve a timestamp value. For example, this technical solution can be scaled to detect any special marker in a data packet or data communication, and is not limited to pattern detection based on a Start of Frame Delimiter (SFD) for packet timestamping purposes. Present implementations can advantageously be applied at least in Ethernet design and verification systems and devices.

Figure 6:
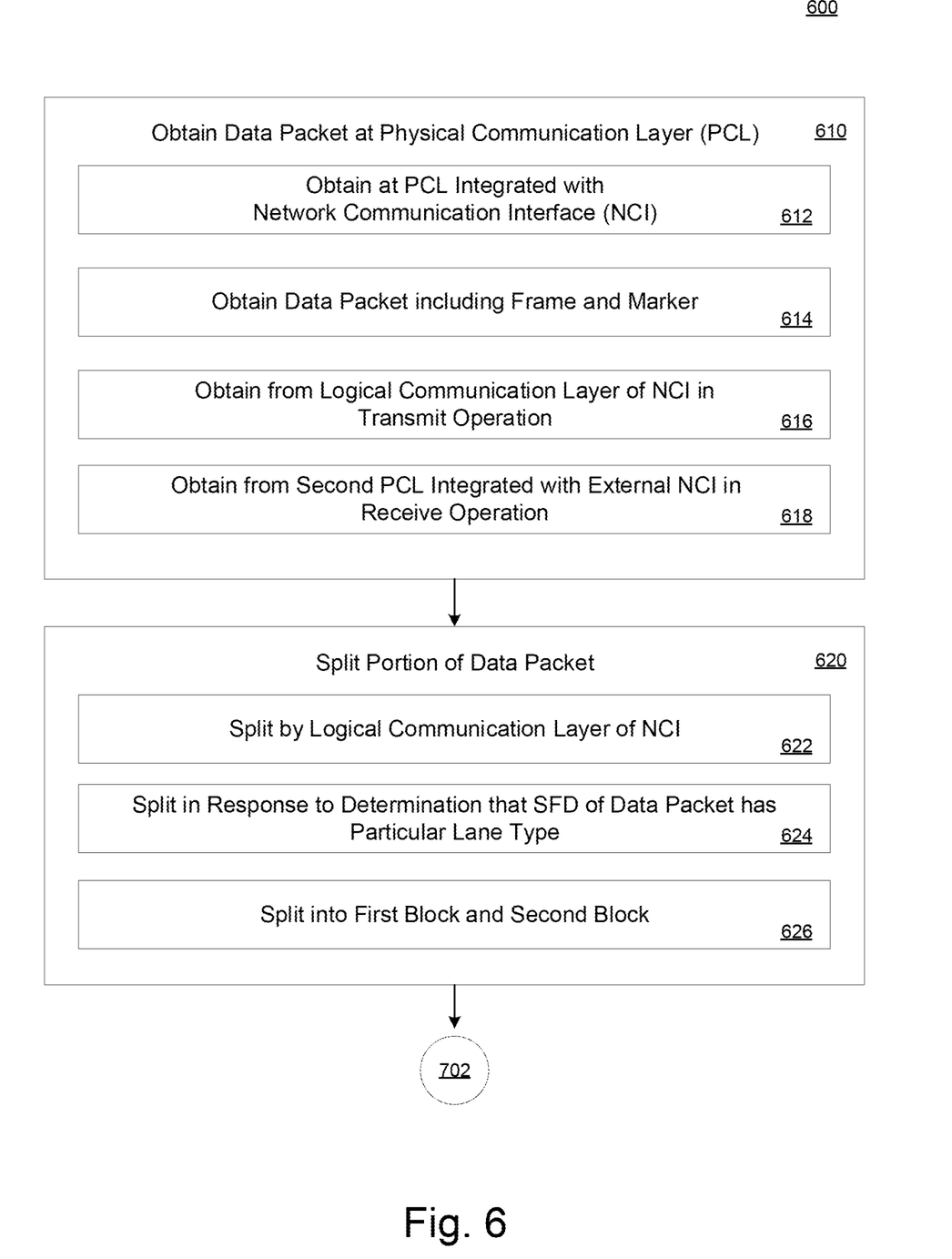
FIG. 6 illustrates a method of high accuracy timestamping of transmissions at a physical layer of communication devices and systems, in accordance with present implementations.

FIG. 6 illustrates a method 600 of high accuracy timestamping of transmissions at a physical layer, in accordance with present implementations. The device or system 100, 200, 300A or 300B can perform method 600 according to present implementations. The method 600 can begin at 610.

At 610, the method 600 can obtain a data packet at the physical communication layer. 610 can include at least one of 612, 614, 616, and 618. At 612, the method 600 can obtain a data packet at a physical communication layer integrated with the network communication interface. At 614, the method 600 can obtain a data packet including one or more of a frame and a marker. At 616, the method 600 can obtain a data packet from a logical communication layer of the network communication interface in a transmit operation. At 618, the method 600 can obtain a data packet from a second physical communication layer integrated with the external network communication interface, in a receive operation. The method 600 can then continue to 620.

At 620, the method 600 can split at least a portion of the data packet. 620 can include at least one of 622, 624, and 626. For example, the control layer or the logical communication layer can split an SFD block at a particular bit or byte address location into two or more split SFD blocks. The control layer or the logical communication layer can then transmit one or more of the splits to another components of a network communication device or interface. At 622, the method 600 can split the data packet by the logical communication layer of network communication interface. At 624, the method 600 can split the data packet in response to the determination that the SFD of the data packet has a particular lane type. For example, the control layer or the logical communication layer can split the packet upon a determination that the packet corresponds to an Ethernet communication compatible with a Lane 4 data structure, and can block or limit a split of the SFD block upon a determination that the packet corresponds to an Ethernet communication compatible with a Lane O data structure At 626, the method 600 can split the data packet into a first block and second block. The method 600 can then continue to 702.

Figure 7:
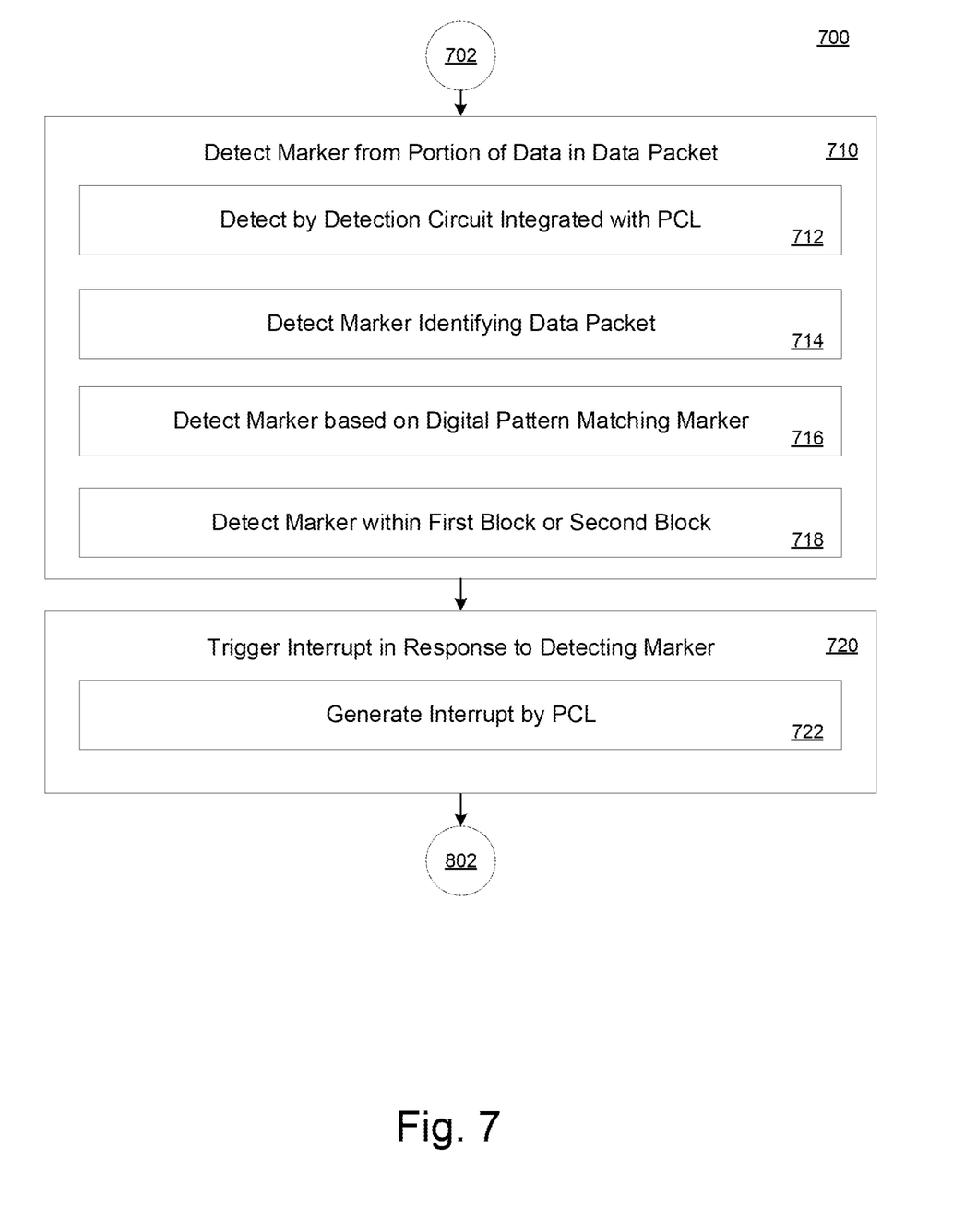
FIG. 7 illustrates a method of high accuracy timestamping of transmissions at a physical Layer of communication devices and systems further to the method of FIG. 6.

FIG. 7 illustrates a method 700 of high accuracy timestamping of transmissions at a physical layer further to the method of FIG. 6. The device or system 100, 200, 300A or 300B can perform method 700 according to present implementations. The method 700 can begin at 702. The method 700 can then continue to 710.

At 710, the method 700 can detect a marker from the portion of data in the data packet. 710 can include at least one of 712, 714, 716, and 718. At 712, the method 700 can detect a marker by the detection circuit integrated with the physical communication layer. The marker can include, but is not limited to, an SFD block compatible with an Ethernet protocol. At 714, the method 700 can detect a marker identifying the data packet. At 716, the method 700 can detect the marker based on the digital pattern matching the marker. At 718, the method 700 can detect the marker within the first block or the second block. The method 700 can then continue to 720.

At 720, the method 700 can trigger an interrupt in response to detecting a marker. 720 can include 722. At 722, the method 700 can generate an interrupt by the physical communication layer. The interrupt can trigger a timestamp operation to write a timestamp to a portion of the packet or to read a timestamp from the packet. The method 700 can then continue to 802.

Figure 8:
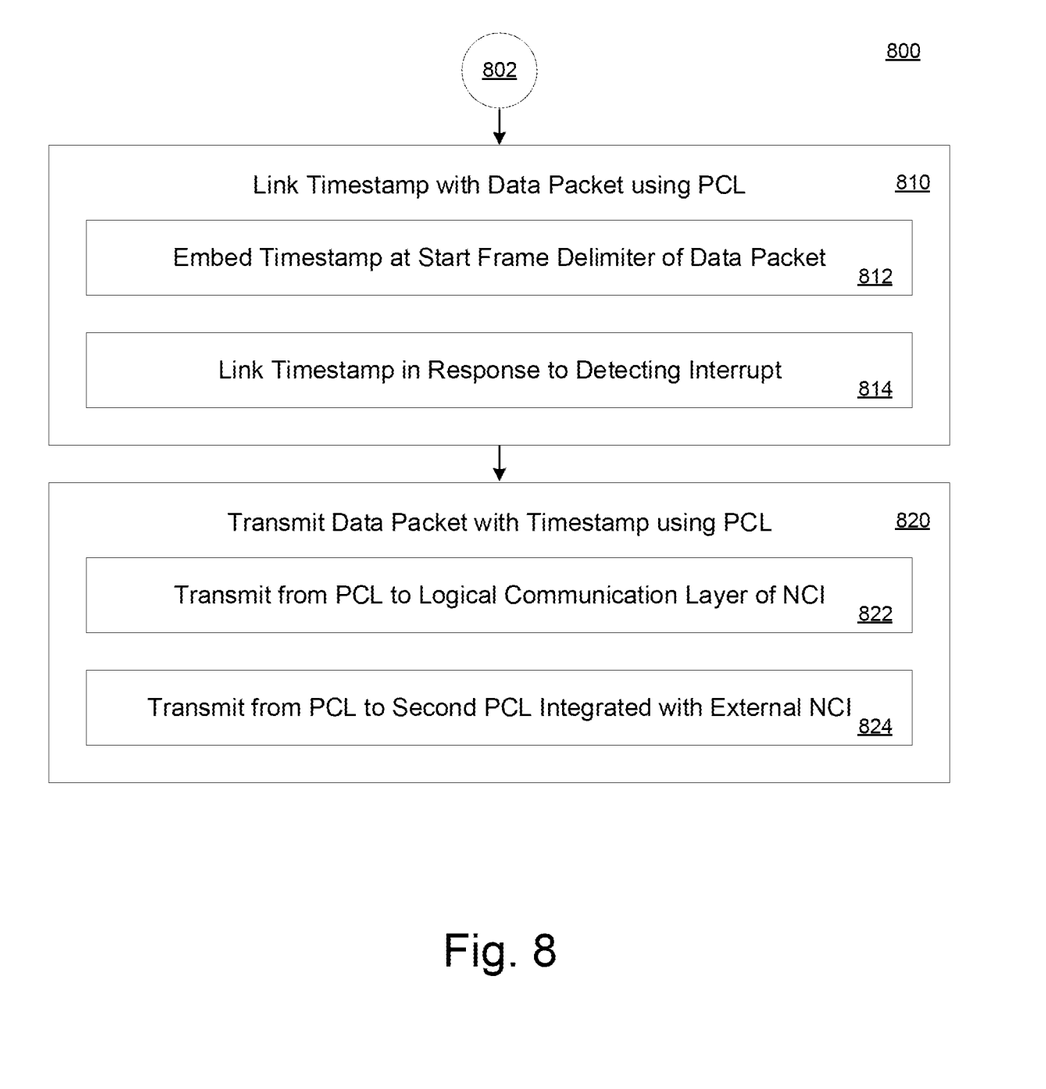
FIG. 8 illustrates a method of high accuracy timestamping of transmissions at a physical layer of communication devices and systems further to the method of FIG. 7.

FIG. 8 illustrates a method 800 of high accuracy timestamping of transmissions at physical layer further to the method of FIG. 7. The device or system 100, 200, 300A or 300B can perform method 800 according to present implementations. The method 800 can begin at 802. The method 800 can then continue to 810.

At 810, the method 800 can link a timestamp with the data packet using the physical communication layer. 810 can include at least one of 812 and 814. At 812, the method 800 can embed a timestamp at the start frame delimiter of the data packet. At 814, the method 800 can link a timestamp with the data packet in response to detecting an interrupt. The method 800 can then continue to 820.

At 820, the method 800 can transmit the data packet with a timestamp using the physical communication layer. 820 can include at least one of 822 and 824. At 822, the method 800 can transmit the data packet from the physical communication layer to the logical communication layer of the network communication interface. At 824, the method 800 can transmit the data packet from the physical communication layer to a second physical communication layer integrated with an external network communication interface. The method 800 can end at 820.

The herein described subject matter sometimes illustrates different components contained within, or connected with, different other components. It is to be understood that such depicted architectures are illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"). The same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Further, unless otherwise noted, the use of the words "approximate," "about," "around," "substantially," etc., mean plus or minus ten percent.

The foregoing description of illustrative implementations has been presented for purposes of illustration and of description. It is not intended to be exhaustive or limiting with respect to the precise form disclosed, and modifications and variations are possible in light of the above teachings or may be acquired from practice of the disclosed implementations. It is intended that the scope of the invention be defined by the claims appended hereto and their equivalents.

What is claimed is:

1. A method, comprising:
   obtaining, at a physical communication layer integrated with a communication interface, a data packet;
   detecting, by a detection circuit integrated with the physical communication layer, a portion of data in the data packet corresponding to a marker identifying the data packet;
   linking, by the physical communication layer and based on the marker, a timestamp with the data packet; and
   transmitting, by the physical communication layer, the data packet linked with the timestamp,
   wherein detecting is performed on the data packet in processing included in the physical communication layer before processing of the data packet by a control layer of the communication interface in a receive stack or after processing of the data packet by the control layer of the communication interface in a transmit stack.

2. The method of claim 1, further comprising:
   linking, by the physical communication layer in response to detecting an interrupt, the timestamp with the data packet.

3. The method of claim 2, further comprising:
   triggering, by the physical communication layer in response to the detecting the marker, the interrupt.

4. The method of claim 1, further comprising:
   transmitting, by the physical communication layer, the data packet linked with the timestamp to a logical communication layer integrated with the communication interface.

5. The method of claim 1, further comprising:
   transmitting, by the physical communication layer, the data packet linked with the timestamp to a second physical communication layer integrated with a second communication interface operatively coupled with and external to the communication interface.

6. The method of claim 1, further comprising:
   obtaining the data packet from a logical communication layer integrated with the communication interface in accordance with a transmit operation of the communication interface.

7. The method of claim 1, further comprising:
   obtaining the data packet from a second physical communication layer integrated with a second communication interface in accordance with a receive operation of the communication interface.

8. The method of claim 1, the communication interface comprising an Ethernet stack, and the physical communication layer comprising a physical medium attachment (PMA) layer of the Ethernet stack.

9. The method of claim 1, the marker comprising a start frame delimiter (SFD), and the detection circuit configured to detect the SFD.

10. The method of claim 9, further comprising:
    splitting, by a logical communication layer integrated with the communication interface in response to a determination that the SFD corresponds to a particular type, the SFD into a first block and a second block; and
    detecting, by the detection circuit, the first block to identify the marker.

11. A device, comprising:
    a physical communication layer integrated with a communication interface, the physical communication layer configured to obtain a data packet, link a timestamp with the data packet and based on a marker identifying the data packet, and transmit the data packet linked with the timestamp; and
    a detection circuit integrated with the physical communication layer, the detection circuit configured to detect a portion of data in the data packet corresponding to the marker,
    wherein detecting is performed on the data packet in processing included in the physical communication layer before processing of the data packet by a control layer of the communication interface in a receive stack or after processing of the data packet by the control layer of the communication interface in a transmit stack.

12. The device of claim 11, further comprising:
    the physical communication layer configured to trigger an interrupt in response to the detecting the marker, and to link the timestamp with the data packet in response to detecting the interrupt.

13. The device of claim 11, further comprising:
    the physical communication layer configured to transmit the data packet linked with the timestamp to one or more of a logical communication layer integrated with the communication interface, and a second communication interface operatively coupled with and external to the communication interface.

14. The device of claim 11, further comprising:
    the physical communication layer configured to obtain the data packet from one or more of a logical communication layer integrated with the communication interface in accordance with a transmit operation of the communication interface, and a second physical communication layer integrated with a second communication interface in accordance with a receive operation of the communication interface.

15. The device of claim 11, the communication interface comprising an Ethernet stack, and the physical communication layer comprising a physical medium attachment (PMA) layer of the Ethernet stack.

16. The device of claim 11, the marker comprising a start frame delimiter (SFD), and the detection circuit configured to detect the SFD.

17. The device of claim 16, further comprising:
    a physical coding sublayer (PCS) integrated with the communication interface, the PCS configured to split the SFD into a first block and a second block in response to a determination that the SFD corresponds to a particular type; and the detection circuit configured to detect the first block to identify the marker.

18. A system, comprising:

a physical communication layer integrated with a communication interface, the physical communication layer configured to obtain a data packet, link a timestamp with the data packet based on a marker identifying the data packet, and transmit the data packet linked with the timestamp; and a detection circuit integrated with the physical communication layer, the detection circuit configured to detect a portion of data in the data packet corresponding to the marker, wherein detecting is performed on the data packet in processing included in the physical communication layer before processing of the data packet by a control layer of the communication interface in a receive stack or after processing of the data packet by the control layer of the communication interface in a transmit stack.

19. The system of claim 18, the communication interface comprising an Ethernet stack, and the physical communication layer comprising a physical medium attachment (PMA) layer of the Ethernet stack.

* * * * *